US009261117B2

(12) United States Patent
Macke

(10) Patent No.: US 9,261,117 B2
(45) Date of Patent: Feb. 16, 2016

(54) PNEUMATIC SHIFTING FORCE SUPPORTING DEVICE

(71) Applicant: HOERBIGER AUTOMOTIVE KOMFORTSYSTEME GMBH, Schongau (DE)

(72) Inventor: Wlodzimierz Macke, Olching (DE)

(73) Assignee: HOERBIGER AUTOMOTIVE KOMFORTSYSTEME GMBH, Schongau (DE)

( * ) Notice: Subject to any disclaimer, the term of this patent is extended or adjusted under 35 U.S.C. 154(b) by 331 days.

(21) Appl. No.: 14/037,584

(22) Filed: Sep. 26, 2013

(65) Prior Publication Data

US 2014/0020552 A1    Jan. 23, 2014

Related U.S. Application Data

(63) Continuation of application No. PCT/EP2012/001403, filed on Mar. 30, 2012.

(30) Foreign Application Priority Data

Mar. 31, 2011 (DE) .......................... 10 2011 015 713

(51) Int. Cl.
*F15B 9/10* (2006.01)
*F15B 15/00* (2006.01)
*F16H 61/30* (2006.01)

(52) U.S. Cl.
CPC . *F15B 15/00* (2013.01); *F15B 9/10* (2013.01); *F16H 61/30* (2013.01); *B60Y 2400/408* (2013.01); *F16H 2061/302* (2013.01)

(58) Field of Classification Search
CPC ..... F15B 9/10; F15B 2013/0409; F16H 61/30
USPC ......................................... 91/364, 375 R, 378
See application file for complete search history.

(56) References Cited

U.S. PATENT DOCUMENTS 5,947,000 A * 9/1999 Kazumori ................. F15B 9/12
                                                              91/364
8,074,533 B2 * 12/2011 Fischer ..................... F15B 9/12
                                                              74/473.11

(Continued)

FOREIGN PATENT DOCUMENTS

DE         19539472 A1   4/1997
DE      102006006652 A1   8/2007

(Continued)

*Primary Examiner* — Thomas E Lazo
(74) *Attorney, Agent, or Firm* — Myers Wolin, LLC

(57) ABSTRACT

A pneumatic shifting force supporting device for a gearbox comprises a housing structure having a compressed air inlet and an air vent, and a control rod and an output unit comprising a working piston defining two pneumatic working chambers. A valve arrangement is functionally provided between control rod and output unit. By acting on the two pneumatic working chambers, the valve arrangement causes a pneumatic follow-up control from the output unit to the control rod comprising two valve pistons, annular sealing edges, valve spools and valve seats. A throttle slide is associated with at least one of the valve pistons and is slidable relative thereto. The throttle slide has a closing edge co-operating with the respective associated valve seat and delimiting at least one throttle passage, the cross-sectional area of which depends on the relative position of the throttle slide with respect to the associated valve piston.

18 Claims, 3 Drawing Sheets

(56) References Cited

U.S. PATENT DOCUMENTS

| | | | | |
|---|---|---|---|---|
| 8,578,809 B2* | 11/2013 | Spaeth | ................ | F16H 61/30 74/473.11 |
| 2010/0175492 A1* | 7/2010 | Spaeth | ................ | F15B 9/12 91/422 |

FOREIGN PATENT DOCUMENTS

| | | |
|---|---|---|
| DE | 102006048254 A1 | 4/2008 |
| DE | 102007026421 A1 | 12/2008 |
| DE | 102007048400 A1 | 12/2008 |
| EP | 2068044 A2 | 6/2009 |

* cited by examiner

PNEUMATIC SHIFTING FORCE SUPPORTING DEVICE

CROSS-REFERENCE TO RELATED APPLICATIONS

This is a continuation of PCT/EP2012/001403, filed Mar. 30, 2012, which claims priority to DE Application 10 2011 015 713.1, filed Mar. 31, 2011, the contents of each of which are incorporated by reference in their entireties.

FIELD OF THE INVENTION

The present invention pertains to a pneumatic shifting force supporting device for a gearbox which comprises a housing structure with a compressed air inlet and an air vent, and a control rod slideable along its axis at the input side, to which an output unit surrounding the control rod can be adjusted in a parallel manner and which includes an airtight, working piston in the housing structure and defines two pneumatic chambers. A valve arrangement is functionally provided between the control rod and the output unit and for fluidic purposes, between the compressed air inlet and the pneumatic chambers. This valve arrangement effects a pneumatic control sequence of the output unit with appropriate pressure on the two pneumatic chambers.

BACKGROUND

Pneumatic shifting force supporting devices of the type mentioned above are particularly used with trucks. They disburden the driver of the respective vehicle by greatly reducing the force that needs to be used at the stick shift when engaging a gear or shifting gears. In practice, a variety of such shifting force supporting devices exist.

Shifting force supporting devices of the type mentioned above have to meet certain requirements which partially conflict with each other's objectives. In addition to the usual demands placed on motor vehicle features (cost-effective, light, compact, high-performance, reliable, low maintenance, durable), there may be specific requirements which are connected to the changing fringe conditions within the same application environment. For example, when engaging different gears in the gearbox, a different amount of force may be necessary. If the goal is for the driver to use mainly the same force on the stick shift when engaging gears, then the power boost would have to be stronger when engaging some gears than when engaging others. Shifting force supporting devices that have so far been proposed to solve this issue are typically structured in an exceedingly complex and elaborate manner. A further problem area is the dynamic requirements of the shifting force supporting device. Not only do different drivers activate the stick shift differently, each driver also expects from the shifting force supporting device optimal support for him or her individually. In addition, different driving situations require different, dynamic shifting procedures. Especially while ascending, a particularly quick gear change is necessary in order to minimize the falling back (loss of speed) of the vehicle during the gear change. Shifting force supporting devices, however, that are construed with especially high shifting dynamics are in danger of overdriving during activation of a stick shift with a lower dynamic which can in turn lead to internal blows or vibrations and/or blows or vibrations to the stick shift.

In light of the afore-described issue, the object of this invention is to supply a shifting force supporting device of the type specified above—when fulfilling the usual demands outlined above—which is characterized by an especially advantageous performance in regards to the dynamic gearbox range under varying operating conditions.

SUMMARY

This problem is solved by this invention in that a shifting force supporting device of the type mentioned above, the two valve pistons coupled with the control rod and located at the output unit in a sealing, slidable manner and two annular sealing edges also coupled with the control rod each cooperate with a valve spool which is arranged relative to the control rod and longitudinally slidable with respect to the output unit. Furthermore, each of the valve spools cooperate with one of the valve seats assigned to the output unit and at least one valve piston, and preferably both, are assigned a throttle slide which is relative to the valve pistons and slidable thereto. The throttle slide features a closing edge which cooperates with the respective valve seat and controls at least one throttle passage which cross-sectional area is dependent upon the relative position of the throttle slide as it relates to the associated valve piston. One of the most important features of the synergistic-functional cooperation with the other design features of the invented shifting force supporting device is that a throttle slide, relative to the respective valve piston and slidable thereto, is functionally and spatially associated with at least one, and preferably both, valve pistons, both connected to the control rod and located at the output unit in a sealing, slidable manner, whereby dependent on the relative position of the throttle slide to the associated valve piston a certain cross-sectional area of a throttle passage appears, which, among other things, is controlled by the throttle slide. This at least one throttle passage is located in the flow path of the compressed air inlet to the respective pneumatic chamber and causes the degree of impact (compressed-air flow) of the respective pneumatic chamber to depend upon the position of the throttle slide relative to the associated valve piston. The larger the cross-sectional area of the throttle passage—due to the relative position of the throttle slide in relation to the associated valve piston—the faster the associated pneumatic chamber is pressurized with compressed air, with a corresponding effect on the shifting dynamics, especially in respect of the design dynamics of the complete shifting amplification.

Hereinafter, to simplify the explanation of the present invention and as far as nothing else changes, preference is to use the, in no way mandatory, design in which both valve pistons as well as the two annular sealing edges are fixed to the control rod and each of the two valve pistons are assigned a throttle side relative to each respective valve and slidable thereto. However, a limiting of the present invention to only the afore-described design cannot be deduced from this.

Since each of the two throttle slides cooperate via a sealing edge with the respectively associated valve seat, which is fixed relative to the output unit, the amount by which the control rod guides the output unit and by which the latter follows the control rod can be directly used as a measure for controlling the cross-sectional areas of the throttle passages, typically in such a way that with increasing advancement of the control rod, the cross-sectional area (without necessarily having a linear relation) increases relative to the output unit.

Vice-versa this has the effect that the cross-sectional area of at least one of the throttle passages associated with the impacted chambers is reduced, so that when the output unit approaches its target position determined by the position of the control rod, thereby increasing a throttling effect in said throttle passage, the danger that the shifting force supporting device overdrives is minimal, even if the shifting force supporting device is designed for a highly dynamic shifting support.

As a result, the present invention provides a shifting force supporting device which features excellent properties especially in regards to shifting dynamics and support function under different demands and conditions, specifically in terms of high shifting comfort, whereby service life and reliability can additionally be enhanced by avoiding internal shocks or vibration and by appropriate material protection.

For typical applications of the present invention, in particular with unregulated shifting force supporting devices, it is most advantageous when the two valve pistons are connected in a fixed position to the control rod. The same applies to the annular sealing edges, which may in particular be located in the same design unit as the respective, associated valve piston. When using the multi-stage shifting force supporting devices, i.e. devices equipped with internal regulated pressure reduction as shown in the present invention, we deviate from this in that the two valve pistons and the annular sealing edges respectively associated with the former can be coupled in axial direction in a slidable manner to the control rod pre-tensioned by a spring.

Through a design individually adapted to the respective gearbox of the throttle passages in respect of their throttle characteristics, the shifting comfort can also be positively influenced. In this sense, under appropriate conditions one can deviate from a linear throttle characteristic, whereby the cross-sectional area of the throttle passage changes linearly across the axial extension in such a way that the throttle passage is designed with a progressive characteristic in the sense of a progressive increase of its cross-sectional area over its axial extension, or a degressive characteristic in the sense of a degressive increase of its cross-sectional area over its axial extension. In qualitative terms, the gradient of the velocity of the pressure build-up increases in the impacted pneumatic chamber in the case of a progressive throttle characteristic with increasing relative displacement of the control rod to the output unit, while decreasing in the case of a degressive throttle characteristic.

If several throttle passages are provided which cooperate with a throttle slide, it is not mandatory that they have a uniform axial extension. Rather, it is possible to release or open to air flow successive, sequential and individual throttle passages by using a corresponding, axial offset of the opening edges of the throttle passages with continued axial offset of the throttle slide. In this case, particularly volatile throttle characteristics can be generated, such as those with abrupt increases of all cross-sectional areas available for the air flow. Thereby, each of the throttle passages is able to provide a constant cross-section via its individual extension, so that for each of the throttle passages a (sudden) change to the cross-sectional area from 0% to 100% is reached when the throttle slide reaches or moves over the opening edge of the respective throttle passage. The throttle passages do not all need to have a matching cross-section. For example, the throttle passage first opened can have a smaller cross-section than the throttle passage opened second, etc.

According to a preferred embodiment of the invention, particularly favorable as regards the structural overhead, the two valve pistons are each part of a piston structure mounted on the control rod which further includes a cylindrical lug that delimits a throttle passage in addition to the throttle slide. The throttle slides may specifically be sleeve-shaped and guided in a longitudinally slidable manner on the associated lug of the respective piston structure. A further favorable embodiment may involve at least one throttle passage with a running groove located in the respective lug of the piston structure, also embracing the valve piston. The radial depth and/or the measured running groove width in the peripheral direction hereby changes in an axial direction of the control rod. The cross-sectional profile achieved this way via the relative position of the throttle slide in relation to the associated valve piston can determine the characteristics of the throttle effect.

In the interest of a preferably even, flow-dynamic impact of the compressed air flow on the two throttle slides, it is advantageous when according to another preferred embodiment of the invention—and when the throttle slides are designed in a sleeve-shaped manner—at least two or more throttle passages are provided. In this way, the risk of tilting the throttle slide is reduced.

According to another preferred embodiment of the invention, a pre-tension spring, which rests on its associated valve piston (or another component firmly positioned at the control rod), acts upon the two throttle slides. By way of such a pre-tension spring, the throttle slide is pre-stressed into the position in which a sealing of the throttle slide occurs relative to the valve seat, via the closing edge working in tandem with the respective, associated valve seat. With the help of the sealing contact of the throttle slide closing edge at the valve seat, pressurized air that passes between the valve spool and the valve seat on the corresponding side of the valve arrangement because of a corresponding, relative position of the control rod to the output unit, is reliably forced through a throttle passage with a slidable cross-section, as provided by this invention and explained above. Bypassing the throttle passage is hereby avoided or at least strongly delimited. In this context it is necessary to point out that the term "closing edge" is not to be understood that when the closing edge touches the valve seat, a (technically entirely possible) complete sealing occurs. The present invention (merely) enables a large degree of sealing between the throttle slide closing edge and the valve seat. Such a merely large degree of sealing, especially when providing a deliberate lack of sealing (e.g. via a defined groove) can be deliberately sought in order to ensure a basic supply to the respective, pressurized pneumatic chamber, independent of the throttle passage.

According to yet another preferred embodiment of the invention, the two valve seats are arranged in a fixed position directly to the output unit. Particular preference is given to a space sleeve located between the two valve seats. A compressed air chamber restricted on both sides by the valve seats can thereby be in constant contact with the compressed air inlet. Said air chamber is preferably restricted radially inwardly by the two valve spools, so that these are sealed relative to one another. In structural terms, the two valve spools may consist of synthetic material, whereby a seal made of elastomer which is sealing and slides along the associated cylindrical sealing surface of the other valve spool, can be arranged at one of the two valve spools. The two valve spools are, as stated, both slidable relative to the control rod as well as relative to the output unit. It is particularly beneficial in terms of structure if they are longitudinally slidable directly along the control rod.

Yet another preferred embodiment of the invention is characterized in that a compression spring arrangement operates between the two valve spools, an action which pre-tensions the valve spool against the associated valve seat. A lifting of the one or the other valve spool from the associated valve seat is carried out—depending on the displacement of the control rod relative to the output unit from the neutral position—by the respective sealing edge coupled to the control rod, which may in particular be arranged at the piston unit (which also encompasses the associated valve piston), whereby the respective sealing edge applies a seal to the associated valve spool so that compressed air is forced towards at least one throttle passage through the corresponding open valve between the valve seat and the valve spool.

According to yet another preferred embodiment of the invention, each valve piston delimits a control chamber which communicates with the associated pneumatic chamber via a passage that is located at the output unit and opens out into the control chamber. This control chamber also communicates with an air vent via an exhaust passage located at the control rod, at the sealing edge of the valve piston raised by the associated valve spool. In the interest of achieving a stable neutral position between control rod and output unit, the sealing edge (of the piston unit) is raised from the valve spool on both sides of the valve arrangement in the output unit, so that both control chambers are attached to the air vent which in turn causes the two pneumatic working chambers to be depressurized.

In a particularly preferred embodiment of the invention, an annulus, restricted by the housing, is designed to be constantly connected to the compressed air inlet at the outer periphery of the working piston, which in turn is constantly connected with the compressed air inlet mentioned above via a pressurized air passage located at the output unit. In this way, a reliable pneumatic connection occurs between the fixed housing and the slidable output unit relative thereto, as well as a correspondingly reliable pressurized air supply to the valve assembly.

While it is technically feasible to construct the output unit in one piece, it is structurally particularly advantageous if the output unit is constructed of several parts and the connecting piece encompasses a support and a clamping tube, whereby the working piston is clamped between the clamping tube and the support. Said multi-piece construction of the output unit allows for a particularly advantageous structural integration of the valve arrangement and other components of the shifting force supporting device into the output unit. The control rod can thereby be guided within the connecting piece, which represents the actual exit to the transmission, and in fact independent of whether or not the entries to and the exits from the shifting force supporting device are positioned on the same side.

In another preferred embodiment of the invention, a centering spring arrangement operates between the control valve and the output unit. This determines the neutral position of the control valve relative to the output unit. A supple and resilient coupling of the control rod with the output unit occurs in such a manner, that the force applied to the stick shift by the driver is transferred via the centering spring arrangement to the output unit by the control rod which is in turn mechanically connected to the stick shift.

The shifting force supplied at the output unit is comprised of two parts, namely the force exerted by the driver on the stick shift on the one hand, and the pneumatic force generated in the pressurized pneumatic chamber on the other. The centering spring arrangement can hereby include mechanical stops which cooperate with one another between the control rod and the output unit at a predetermined maximum displacement of the two parts and, via a direct coupling of the control rod to the output unit, allow for a purely mechanical activation of the gearbox via the stick shift.

In yet another particularly preferred structural development, the housing includes a housing block, a profile tube and a cover plate, whereby the output unit is guided at the cover plate. The air vent may be integrated in the cover plate and the compressed air inlet may be located in the profile tube, with the working piston of the output unit guided through the tube's cylindrical inner bore. Finally, the invented shifting force supporting device can have a lock which operates between the housing and the output unit and/or the housing and the control unit, in order to secure the correct position of the output unit or the control unit relative to the housing through the appropriate lock. Such locking can especially help to prevent or reduce resonance effects.

DETAILED DESCRIPTION OF THE PREFERRED EMBODIMENTS

Figure 1:
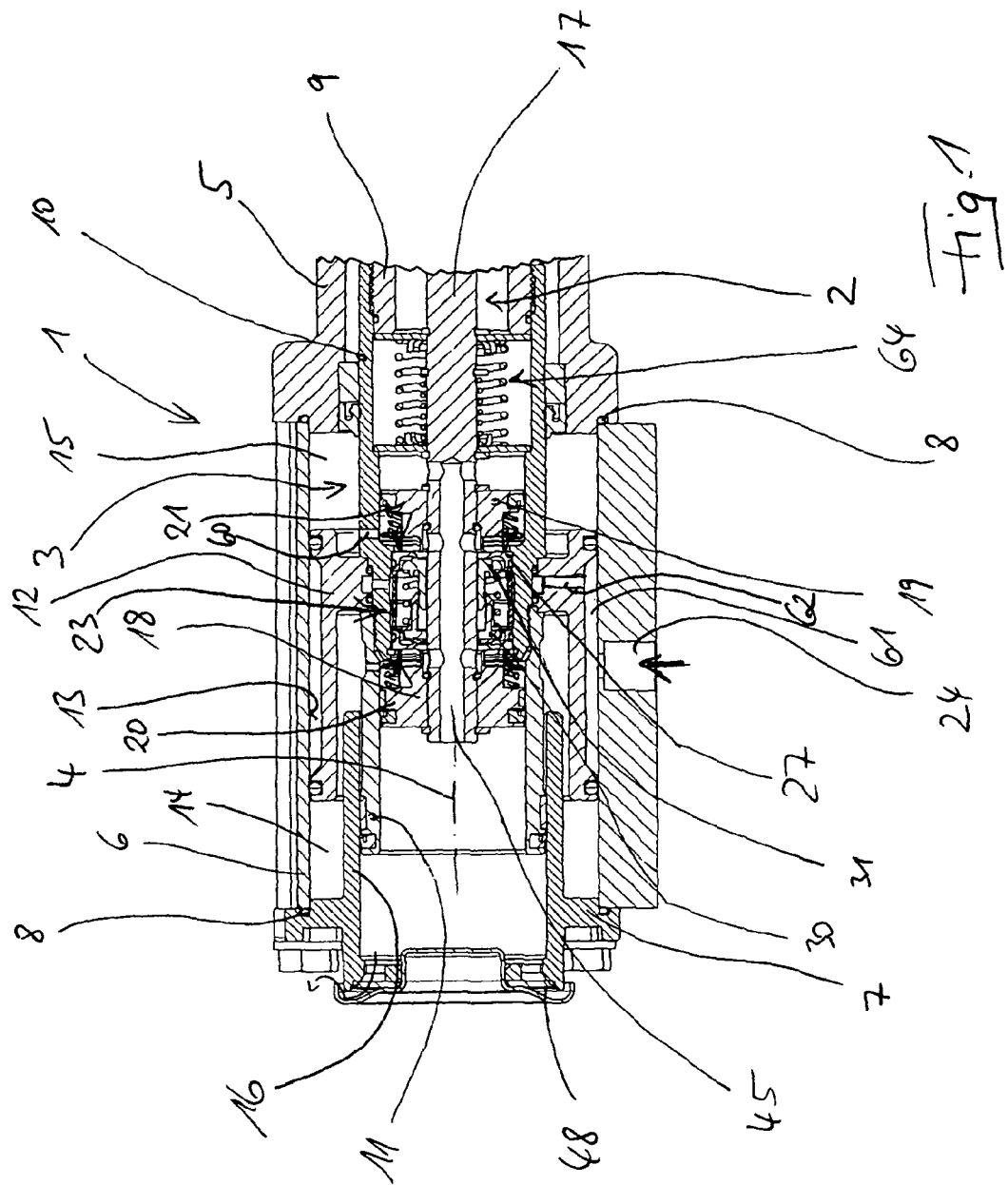
FIG. 1 is a longitudinal section of a pneumatic shifting force supporting device through the area relevant to the present invention, designed according to the invention.

The shifting force supporting device shown in the diagram has three primary functional units, namely housing structure 1, input unit 2 and output unit 3 surrounding it. Input unit 2 and output unit 3 are hereby slidable relative to one another along axis 4 and relative to housing structure 1.

Housing structure 1 is essentially composed of three components, namely housing block 5, profile tube 6 and cover plate 7. The profile of tube 6 is hereby tightly clamped between housing block 5 and cover plate 7, to which purpose sealing rings 8 press frontally on both sides of profile tube 6.

Output unit 3 is also constructed of several parts in that it is assembled from substantially one connecting piece 9, one carrier 10, one clamping tube 11 and a working piston 12. Connecting piece 9 hereby represents the actual output which can be coupled to the shifting rod input of a gearbox. Carrier 10 is screwed onto connecting piece 9. Clamping tube 11 is in turn screwed onto carrier 10, whereby working piston 12 is clamped between clamping tube 11 and carrier 10. Working piston 12 is hereby tightly guided along a cylindrical inner bore 13 of profile tube 6 and defines two pneumatic chambers 14, 15. In order to seal working chamber 14 located at the end, clamping tube 11 is guided tightly in a slidable manner on cylindrical lug 16 of cover plate 7.

Input unit 2 essentially consists of control rod 17 which can be coupled with a stick shift, thereby representing the actual input of the shifting force supporting device, and two piston structures 18, 19 that are fixed to the control rod. Each of the two piston structures 18, 19 comprise valve piston 20 and 21, respectively, guided tightly and in a slidable manner in a cylindrical bore of output unit 3 in order to delimit the associated control chamber 22, namely valve piston 20 located at the end in the clamping tube 11 and valve piston 21 located in the carrier 10.

Figure 2:
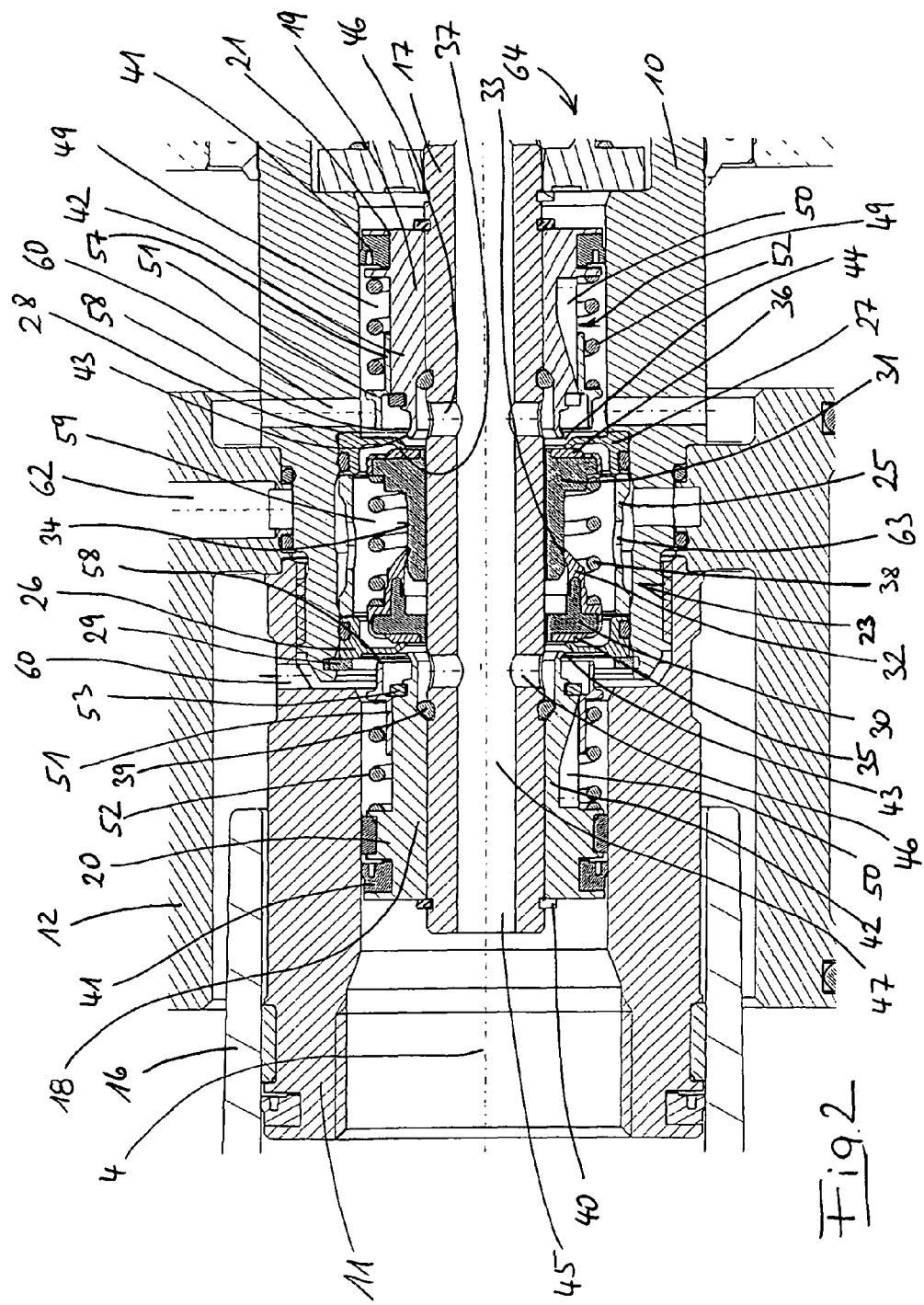
FIG. 2 is an enlarged view of the valve arrangement area of a shifting force supporting device which substantially corresponds to that in FIG. 1 and differs only in a few details.
Figure 3:
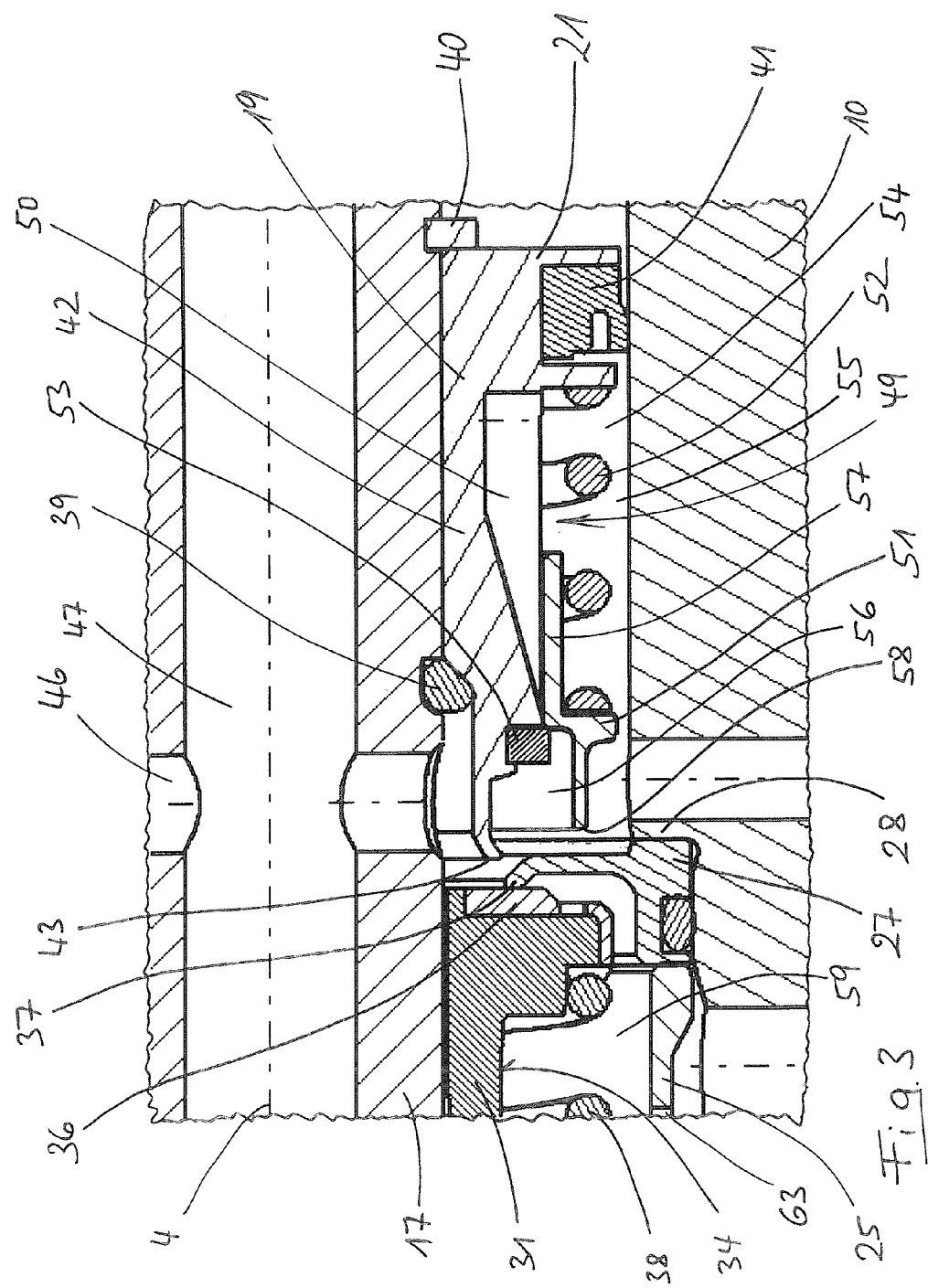
FIG. 3 is a further, enlarged portion of the valve arrangement shown in FIG. 2.

The two piston structures 18, 19 form a functional component of valve arrangement 23 (cf. FIG. 2) which functionally sits between control rod 17 and output unit 3 and is fluidically arranged between compressed air inlet 24 located at housing structure 1, namely at profile tube 6, and the two pneumatic working chambers 14, 15. Valve arrangement 23 causes a pneumatic control sequence of output unit 3 to control rod 17 via the appropriate pressurization of the two working chambers 14, 15 with compressed air. Valve arrangement 23 is designed in the following manner:

In output unit 3, namely in carrier 10, two fixed valve seats 26, 27 are spaced apart from one another at a defined and predetermined distance by space sleeve 25. The positioning is secured by a ledge 28 on the one hand, and by a locking ring 29 on the other. In the space between the two valve seats 26, 27, two valve spools 30, 31 are provided which are both slidable along control rod 17 and tightly sealed to one another. For the purposes of sealing, an elastomer sealing element 32 is connected to one of the valve spools 30, which has a radially annular sealing edge 33 which slides tightly on a cylindrical sealing surface 34 of the other valve spool 31. Both valve spools 30, 31 furthermore frontally display elastomer sealing surfaces 35 and 36 which cooperate with sealing edge 37 of the respectively associated valve seat 26 or 27. The two valve spools 30, 31 are pre-tensioned against the associated valve seats 26 or 27 by means of compression spring arrangement 38 allocated between the two valve spools 30, 31.

Both piston structures 18 and 19 that are fixed on the control rod 17 between a sealing ring 39 and a locking ring 40 include a cylindrical lug 42 aside from the actual valve piston 20 or 21 that displays a tightly running sealing ring 41 at output unit 3. At the piston structures there is a frontal, annular sealing edge 43 which can cooperate with each respective valve spool 30 or 31 in order to lift it from the corresponding valve seat 26 or 27. For this purpose, the annular sealing edge 43 radially opposes the elastomer sealing surface 35 or 36 of the respective valve spool 30 or 31 within the associated valve seat 26 or 27. In the neutral position shown in the diagram, the two annular sealing edges 43 keep a predetermined distance to the valve spools 30 and 31 so that an annular gap 44 exists between the corresponding sealing edge 43 and the associated valve spool 30 or 31, which communicates with housing structure 1 located at the end via an exhaust passage 45 assigned to cover plate 8. The exhaust passage 45 includes an individual, radial bore 46 and a common axial bore 47 in the control rod.

At the two piston structures 18 and 19, namely at their cylindrical lugs 42, there are three throttle passages 49 which are evenly distributed around the axis. The throttle passages 49 are hereby formed respectively by a running groove 50 located in the respective lug 42 of piston structure 18 or 19, whose radial depth changes in axial direction of control rod 17, i.e. increases in the direction of the respective valve piston 20 and 21. Furthermore, a sleeve-shaped throttle slide 51 is guided longitudinally on the cylindrical lug 42 of each piston structure 18 and 19. The throttle slide is hereby axially pre-tensioned in the direction of a locking ring 53 which forms a stop by means of a pre-tension spring 52 which rests on the associated valve piston 20 or 21. In this sense, the throttle slide 51 represents a stop for the associated throttle passages 49 since the flow path between part 54 of control chamber 55 located in front of valve piston 20 or 21 and part 56 of control chamber 55 which lies next to corresponding valve seats 26 or 27 is significantly defined by the cooperation of shroud 57 of the corresponding valve spool 51 and running groove 50 which is located at stop 52 of the associated piston structure 18 or 19. The tightest cross-section of the respective flow path and hence the throttle effect occurring in the throttle passage thus strongly depend on the position that throttle slide 51 takes in relation to associated piston structure 18 or 19.

Throttle slides 51 frontally display a closing edge 58 which acts in conjunction with the respectively associated valve seat 26 or 27. If control rod 17 is slid relative to output unit 3, sealing edge 43 seals one of the piston structures 18 or 19 at the sealing edge 35 or 36 of the associated valve spool 30 or 31 and lifts it from the associated valve seat 26 or 27 under continual movement of control rod 17. In this way, compressed air chamber 59 located between the two valve seats 26 and 27 is inwardly radially delimited by the two valve spools 30 and 32 is connected with part 56 of control chamber 55 which lies next to the corresponding valve seat 26 or 27. At the same time, when closing edge 58 of the respective throttle slide 51 comes into contact with valve seat 26 or 27 causing control rod 17 to slide, this causes throttle slide 51 (against the force of pre-tension spring 52) to slide relative to piston structure 18 or 19 so that throttle passage 49 opens up (more widely). In contrast, on the opposite side of valve unit 23 control chamber 55 stays connected to exhaust passage 45.

Each of the two control chambers 55 continuously communicate with the corresponding pneumatic working chamber 14 or 15 via passage 60 located at and opening into output unit 3. Compressed air chamber 59 continues to be connected with compressed air inlet 24. At the outer periphery of working piston 12, an annulus 61 connected to compressed air inlet 24 and delimited by profile tube 6 of housing structure 1 is shown, which is in constant contact with compressed air chamber 59 via compressed air passage 62 located in output unit 3 and an aperture 63 located in space sleeve 25.

A centering spring arrangement 64 operates between control rod 17 and output unit 3 and determines the neutral position of the two components relative to one another, in which, as described above, both pneumatic working chambers 14 and 15 communicate with air vent 48.

What is claimed is:

1. A pneumatic shifting force supporting device for a gearbox comprising:
   a. a housing structure (1) which includes a compressed air inlet (24) and an air vent (48),
   b. a control rod (17) that is slidable along the input-side and along its axis (4),
   c. an output unit (3) which surrounds the control rod and is slidable thereto in a parallel manner, and
   d. a working piston (12) tightly guided in the housing structure (1), defining two pneumatic working chambers (14, 15), wherein, there is a valve arrangement (23) between the control rod and the output unit, fluidically located between the compressed air inlet and the pneumatic working chambers, wherein by means of an appropriate pre-tension of the two pneumatic working chambers, this arrangement causes a pneumatic sequence of the output unit to the control rod and the arrangement includes two valve pistons (20, 21) tightly guided in a slidable manner at the output unit, coupled with the control rod, and two annular sealing edges (43), coupled with the control rod, each cooperating with a valve spool (30, 31) that is longitudinally guided relative to the control rod as well as to the output unit, and wherein each of the two valve spools hereby cooperate with a valve seat (26, 27) associated with the output unit, and a slidable throttle slide (51) is associated with at least one, preferably both, valve pistons, and wherein the throttle slide has a closing edge (58) which cooperates with the respective, associated valve seat, and delimits at least one throttle passage (49), the cross-sectional area of which depends on the relative position of the throttle slide with respect to the associated valve piston.

2. The pneumatic shifting force supporting device of claim 1, wherein the valve pistons (20, 21) are coupled in a fixed position to the control rod (17).

3. The pneumatic shifting force supporting device of claim 1, wherein the valve pistons (20, 21) are coupled to the control rod (17), slidable in an axial direction thereto.

4. The pneumatic shifting force supporting device of claim 1, wherein the annular sealing edges (43) are coupled in a fixed position to the control rod (17).

5. The pneumatic shifting force supporting device of claim 1, wherein the annular sealing edges (43) are coupled to the control rod (17), slidable in an axial direction thereto.

6. The pneumatic shifting force supporting device according to claim 1, wherein the throttle passage (49) displays a linear characteristic in terms of a linear change of its cross-sectional area over its axial extension.

7. The pneumatic shifting force supporting device of claim 1, wherein the throttle passage (49) has a progressive characteristic in terms of a progressive increase of its cross-sectional area over its axial extension.

8. The pneumatic shifting force supporting device of claim 1, wherein the throttle passage (49) has a degressive characteristic in terms of a degressive increase of its cross-sectional area over its axial extension.

9. The pneumatic shifting force supporting device of claim 1, wherein the valve pistons (20, 21) are part of a piston structure (18, 19), further including a cylindrical lug (42) which delimits at least one throttle passage (49).

10. The pneumatic shifting force supporting device of claim 1, wherein the throttle slide (51) is sleeve-shaped and guided longitudinally in a slidable manner on the associated lug (42) of the piston structure (18, 19).

11. The pneumatic shifting force supporting device of claim 10, wherein the at least one throttle passage (49) includes one running groove (50) displayed in the respective lug (42) of the piston structure (18, 19), whereby the radial depth, or width measured in the peripheral direction of the groove changes in the axial direction of the control rod (17).

12. The pneumatic shifting force supporting device of claim 1, wherein at least two throttle passages (49) are provided, which are arranged preferably evenly around the axis (4) of the control rod (17).

13. The pneumatic shifting force supporting device of claim 12, wherein throttle passages (49) have a different axial extension.

14. The pneumatic shifting force supporting device of claim 1, wherein a pre-tension spring (52) which rests on the corresponding valve piston (20, 21) acts upon the two throttle slides (51).

15. The pneumatic shifting force supporting device of claim 1, wherein each of the valve pistons (20, 21) delimits a control chamber (55), which communicates with the corresponding pneumatic working chamber (14, 15) via a passage (60) located in and opening into output unit (3), and which communicates with air vent (48) via an exhaust passage (45) provided on control rod (17) at the sealing edge (43), raised by the associated valve spool (30, 31).

16. The pneumatic shifting force supporting device of claim 1, wherein the compressed air chamber (59) which is located in the output unit (3) between the two valve seats (26, 27), is permanently connected to the compressed air inlet (24).

17. The pneumatic shifting force supporting device of claim 1, wherein the closing edges (58) of the throttle slides (51) are provided as a complete seal against the respective, associated valve seat (26, 27).

18. The pneumatic shifting force supporting device of claim 1, wherein the closing edges (58) of the throttle slides (51) are provided to mostly seal the respective, associated valve seat (26, 27) while maintaining a defined leakage.

* * * * *